US009489858B2

(12) United States Patent
Mengotti et al.

(10) Patent No.: US 9,489,858 B2
(45) Date of Patent: Nov. 8, 2016

(54) REAL-TIME SIMULATION SYSTEM OF THE EFFECTS OF ROTOR-WAKE GENERATED AERODYNAMIC LOADS OF A HOVER-CAPABLE AIRCRAFT ON THE AIRCRAFT ITSELF, AND METHOD THEREOF

(75) Inventors: Riccardo Bianco Mengotti, Samarate (IT); Francesco Scorcelletti, Samarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 450 days.

(21) Appl. No.: 14/232,841

(22) PCT Filed: Jul. 18, 2012

(86) PCT No.: PCT/IB2012/053666
§ 371 (c)(1),
(2), (4) Date: May 9, 2014

(87) PCT Pub. No.: WO2013/011470
PCT Pub. Date: Jan. 24, 2013

(65) Prior Publication Data
US 2014/0242553 A1    Aug. 28, 2014

(30) Foreign Application Priority Data

Jul. 18, 2011    (IT) .............................. TO20110071 U

(51) Int. Cl.
*G09B 9/46* (2006.01)
(52) U.S. Cl.
CPC ..................................... *G09B 9/46* (2013.01)

(58) Field of Classification Search
CPC ........................................................ G09B 9/46
USPC ............................................................ 434/33
See application file for complete search history.

(56) References Cited

U.S. PATENT DOCUMENTS 3,400,471 A    9/1968  Papin et al.
5,860,807 A    1/1999  McFarland et al.

OTHER PUBLICATIONS

Palo, Filippo. Wake Models for Real-Time Rotorcraft Simulation. American Institute of Aeronautics and Astronautics, pp. 1-11.
Horn, Joseph F., Derek O. Bridges, Daniel A. Wachspress, and Sarma L. Rani. Implementation of a Free-Vortex Wake Model in Real-Time Simulation of Rotorcraft. vol. 3. Journal of Aerospace Computing, Information, and Communication, Mar. 2006. pp. 93-114.
Pulla, Devi Prasad. A Study of Helicopter Aerodynamics in Ground Effect. Dissertation; The Ohio State University, 2006. pp. ii-197.

*Primary Examiner* — Xuan Thai
*Assistant Examiner* — Robert P Bullington
(74) *Attorney, Agent, or Firm* — Leason Ellis LLP

(57) ABSTRACT

A real-time simulation system of the aerodynamic loads generated by the wake of a rotor of a hover-capable aircraft on the aircraft itself is described, said system comprising: a cockpit seat; a simulated control device able to receive a simulated command to simulate a flight condition of the aircraft; a plurality of simulation devices able to generate a simulated representation of the flight condition; and a processing unit configured to receive a first signal associated with the command given via the control device and to generate a second control signal for the plurality of simulation devices associated with the simulated aerodynamic loads. The processing unit cyclically generates a vortex ring, associates one or more control points with the vortex ring, computes the velocity induced on the control points, moves and updates the vortex ring, and generates the second signal on the basis of the velocities induced on the control points.

22 Claims, 6 Drawing Sheets

REAL-TIME SIMULATION SYSTEM OF THE EFFECTS OF ROTOR-WAKE GENERATED AERODYNAMIC LOADS OF A HOVER-CAPABLE AIRCRAFT ON THE AIRCRAFT ITSELF, AND METHOD THEREOF

CROSS REFERENCE TO RELATED APPLICATIONS

The present application is a U.S. National Phase of International Patent Application PCT/IB2012/053666, filed Jul. 18, 2012, which claims priority to Italian Patent Application No. TO2011U000071, filed Jul. 18, 2011, each of which is incorporated herein by reference in its entirety.

TECHNICAL FIELD

The present invention relates to a real-time simulation system of the effects of rotor-wake generated aerodynamic loads of a hover-capable aircraft, in particular a helicopter or a convertiplane, on the aircraft itself.

The present invention also relates to a method supported by a processing unit to simulate in real-time the effects of rotor-wake generated aerodynamic loads of a hover-capable aircraft on the aircraft itself.

BACKGROUND ART

In the aeronautic sector, flight simulation systems are known of that basically comprise:
- a cockpit seat for the pilot to be trained;
- a plurality of controls that can be operated by the pilot to make manoeuvres and set simulated flight conditions;
- a graphical interface, for example a screen, observable by the pilot and able to provide the pilot with a simulated visual representation of the flight, for example by varying the simulated field of view and through the readings on the simulated flight instruments; and
- a plurality of actuators able to exert simulated aerodynamic loads on the cockpit seat, these being determined by the manoeuvres and flight conditions simulated by the pilot via the controls.

Simulation systems also comprise a processing unit configured to:
- receive as input the commands associated with the manoeuvres and simulated flight conditions;
- compute the values of the simulated aerodynamic loads resulting from the above-stated commands; and
- generate a series of control signals for the graphical interface and the actuators so as to update both the visual representation of the simulated flight and the simulated aerodynamic loads.

It is also known that the interaction of the rotor wake with the aircraft influences the local velocities on the rotor plane, the fuselage and the aerodynamic control surfaces, generating a change in the aerodynamic loads to which the aircraft is subjected during the various phases of flight.

In order to simulate the interaction of the rotor wake with the aircraft, it is known to:
- experimentally measure the aerodynamic loads on the aircraft associated with given manoeuvres and flight conditions; and
- store these aerodynamic loads associated with given manoeuvres and flight conditions on the processing unit.

According to this technique, the processing unit controls the graphical interface and the actuators so that both the visual representation and the simulated aerodynamic loads are similar to those stored on the unit for manoeuvres and flight conditions approximately the same as those simulated by the pilot through the controls.

The above-described technique is particularly expensive as it requires performing numerous flight tests that are inevitably approximated in the simulation of the aerodynamic flight loads, as both the visual representation and the simulated aerodynamic loads are associated with manoeuvres and flight conditions only approximately similar to those simulated by the pilot through the controls.

According to another technique, the processing unit is configured to compute a mathematical model of the behaviour of the rotor's wake. The processing unit generates the simulated aerodynamic loads on the cockpit seat on the basis of the commands simulated by the pilot and its stored mathematical model.

A first example of a mathematical model is represented by the models known in the literature as "prescribed wake" models. These models are particularly simple to compute for the processing unit.

In this way, the processing unit is able to generate the visual representation and/or the simulated flight loads on the pilot's cockpit seat in a substantially simultaneous manner with the simulated commands given by the pilot.

In other words, the simulation system can essentially simulate in real time the flight loads generated by the rotor wake on the aircraft.

However, due to the simplicity of the "prescribed wake" model, the simulated flight loads are approximative and, in consequence, not very representative of the real flight loads. It follows that the simulation capability of the simulator is reduced.

Although very precise mathematical models of rotor wake are known, for example from computational fluid dynamics, they are extremely complex and therefore would require significant processing time on the processing unit.

Thus, the use of these very precise mathematical models would not effectively allow simulating the flight loads generated by the rotor wake on the aircraft in real time, as required in flight simulators.

There is a perceived need in the sector to have flight simulation systems for aircraft capable of hovering that are able to generate simulated aerodynamic loads associated with the interaction of the rotor wake with the aircraft, substantially in real time and with a high degree of precision.

Aircraft flight simulation systems are known, for example, from RU2367026 and GB802213.

DISCLOSURE OF INVENTION

The object of the present invention is the realization of a real-time simulation system of the aerodynamic loads generated by the rotor wake of a hover-capable aircraft on the aircraft itself, which enables the above-stated requirement to be satisfied in a simple and inexpensive manner.

The above-stated object is achieved by the present invention, in so far as it relates to real-time simulation system of the effect of the aerodynamic loads generated by the rotor wake of a hover-capable aircraft on the aircraft itself, comprising:
- a cockpit seat for a pilot;
- at least one simulated control device of said aircraft that is able to receive a simulated command from said pilot to simulate a flight condition of said aircraft;

simulation means able to generate a simulated representation of said flight condition that is perceptible from the cockpit seat;
a processing unit configured to receive as input a first signal associated with said command given via said control device and to generate and output a second control signal for said simulation means associated with said simulated aerodynamic loads;
characterized in that said processing unit is further configured to execute a cycle comprising the steps of:
generating, with a given periodicity and in a simulated flow field, a vortex ring with a radius associated with the value of said rotor's disc circumference and with a velocity circulation proportional to the thrust of said rotor set by the pilot via said control device;
associating a number of control points with said vortex ring;
computing the velocity induced on said control points by the vortex ring and/or by at least some of the other vortex rings present in said simulated flow field and the asymptotic speed of the air with respect to said aircraft;
moving said vortex ring according to said velocities induced on said control points;
updating said vortex ring after said movement step;
computing the velocity induced on at least one point of interest of said aircraft on the basis of the velocities induced on said control points of said vortex rings present in the simulated flow field and said asymptotic speed; and
generating said second control signal on the basis of said velocity induced on said point of interest of the aircraft.

The present invention also relates to a method supported by a processing unit to simulate in real-time the effects of rotor-wake generated aerodynamic loads of a hover-capable aircraft on the aircraft itself, comprising the steps of:
simulating a flight condition of said aircraft;
generating, by means of said processing unit, a simulated flight representation of said flight condition that is perceptible from a cockpit seat for a pilot;
characterized in that it comprises the step of configuring said processing unit to execute a cycle comprising the steps of:
generating, in a simulated flow field and with a certain periodicity, a vortex ring with a radius associated with said rotor's disc radius and with a velocity circulation proportional to the thrust of said rotor set by the pilot via said control device;
associating a number of control points with said vortex ring;
computing the velocity induced on said control points by the vortex ring and/or by at least some of the other vortex rings present in said simulated flow field and the asymptotic speed of the air with respect to said aircraft;
moving said vortex ring according to said velocities induced on said control points;
updating said vortex ring after said movement step;
computing the velocity induced on at least one point of interest of said aircraft on the basis of the velocities induced on said control points of said vortex rings present in said simulated flow field and said asymptotic speed; and
generating said simulated flight representation on the basis of said velocity induced on said aircraft.

BRIEF DESCRIPTION OF THE DRAWINGS

For a better understanding of the present invention, a preferred embodiment is described below, purely by way of non-limitative example and with reference to the attached drawings, where.

BEST MODE FOR CARRYING OUT THE INVENTION

Figure 1:
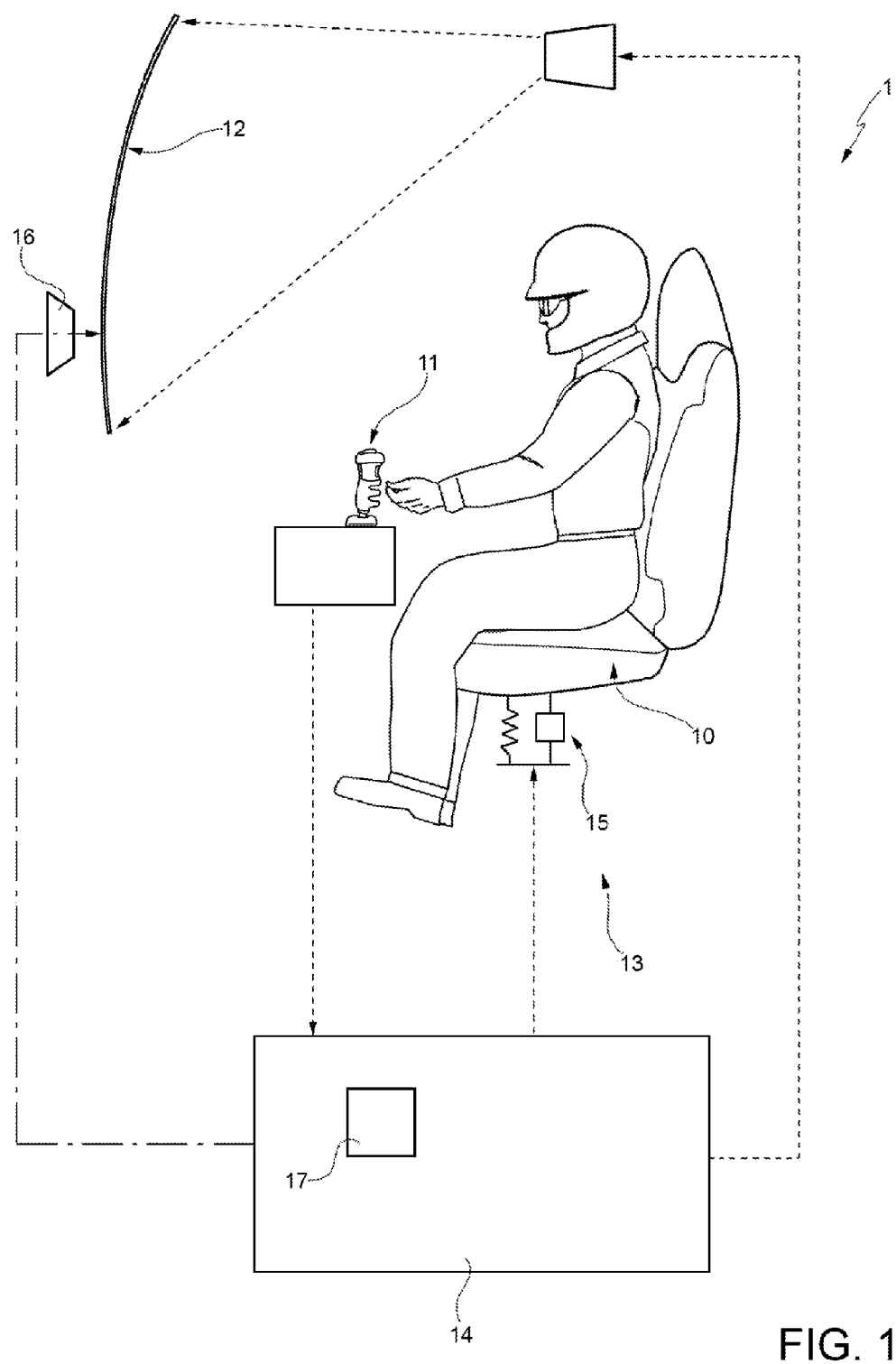
FIG. 1 schematically shows a flight simulation system for an aircraft capable of hovering, made in accordance with the present invention.

With reference to FIG. 1, reference numeral 1 indicates a real-time simulation system of the aerodynamic loads generated by the wake of a rotor 2 of a hover-capable aircraft on the aircraft itself.

The simulation system 1 is, in particular, a pilot training system.

In particular, the aircraft is capable of hovering and could be a helicopter or a convertiplane.

Figure 2:
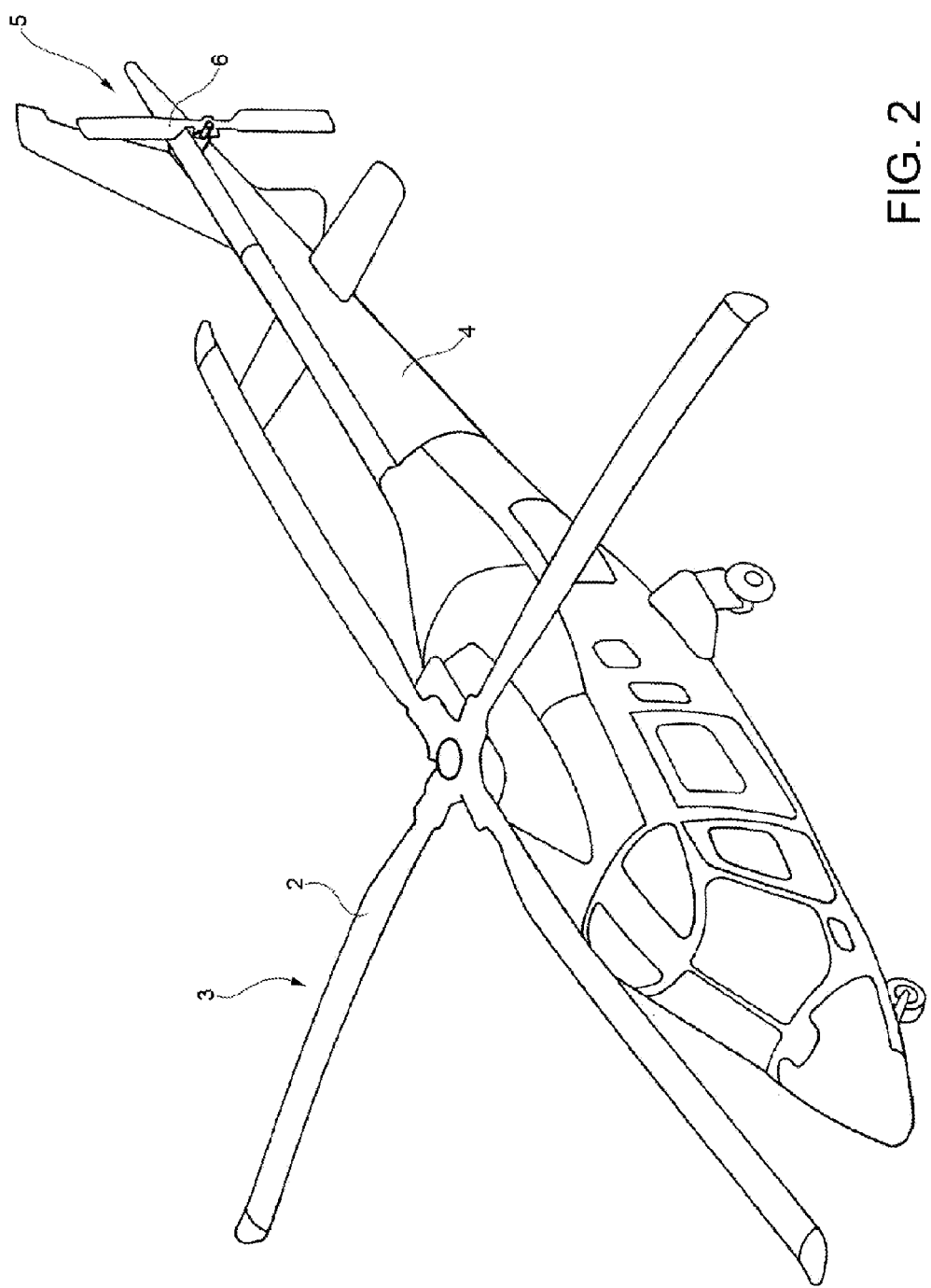
FIG. 2 schematically shows an aircraft.

In the case illustrated in FIG. 2, the aircraft is a helicopter 3 and basically comprises a fuselage 4, the rotor 2 projecting from the top of the fuselage 4 and a plurality of control surfaces 5 represented, for example, and in a non-limitative manner, by a tail rotor 6.

The system 1 basically comprises:
a cockpit seat 10 for a pilot to be trained;
a plurality of simulated control devices 11, such as a joystick or control stick for example, which can be operated by the pilot to give commands representative of manoeuvres and simulated flight conditions;
a graphical interface 12, for example a screen, visible to the pilot and able to provide the pilot with a visual representation of the simulated flight; and
a plurality of simulation devices 13 able to create a simulated representation of the flight perceptible from the cockpit seat 10.

More specifically, the simulation devices 13 comprise:
a plurality of actuators 15 able to exert simulated aerodynamic loads in the cockpit seat 10, these being determined by the manoeuvres and flight conditions simulated by the pilot via the control devices 11; and
a display device 16, which is able to display a simulated visual representation of the flight on the graphical interface 12. This simulated visual representation is determined by the manoeuvres and flight conditions simulated by the pilot via the control devices 11.

In particular, the simulated graphical representation is obtained both as a simulation of the pilot's field of view and as a series of simulated flight readings provided to the respective flight instruments displayed on the graphical interface 12.

In detail, the processing unit 14 is configured to receive the commands imparted by the pilot to the control devices 11 in input and to generate and output control signals for the simulation devices 13 associated with the simulated aerodynamic loads to be generated on the cockpit seat 10.

The processing unit 14 comprises a storage unit 17 in which important data regarding the rotor 2 is stored, such as the geometrical characteristics of the rotor 2 for example, and important data regarding helicopter 3, such as the lift and resistance coefficients of the control surfaces 5 of the helicopter 3 for example.

The processing unit 14 is configured to simulate in real time the aerodynamic loads generated by the wake of the rotor 2 on the helicopter 3 and on the further points of interest in the flow field.

To that end, the processing unit 14 is configured to simulate the wake of the rotor 2 in real time as a plurality of annular vortical singularities, hereinafter referred to in the present description as vortex rings 30. Thanks to this, the processing unit 14 exploits the fact that accurate analytical solutions are known for the velocity field induced by the vortex rings 30.

Advantageously, the processing unit 14 is configured to cyclically:
generate, with a given period $\Delta\tau$ and in a simulated flow field, a vortex ring 30 with a radius r associated with the value of the disc circumference of the rotor 2 and with a velocity circulation proportional to the thrust T of the rotor 2 set by the pilot via the control device 11;
associate a number of control points A, B, C and D with the vortex ring 30;
compute the velocities induced on said control points by the vortex ring 30 and/or by at least some of the other vortex rings 30 present in said simulated flow field and the asymptotic speed Vasin of the air with respect to the helicopter 3;
move the vortex ring 30 according to said velocities induced on said control points A, B, C and D;
update the vortex ring 30 after said movement step;
compute the velocities induced on certain points of interest, for example, the surfaces 5 of the helicopter 3, on the basis of the velocities induced on the control points A, B, C and D of the vortex rings 30 present in the flow field and the asymptotic speed Vasin; and
generate control signals for the simulation devices 13, on the basis of the velocities induced on the surfaces 5 of the helicopter 3.

The processing unit 14 is further configured to eliminate the vortex ring 30 from the flow field after a given time interval has expired.

In other words, the processing unit 14 simulates the wake of the rotor 2 by releasing a series of vortex rings 30 in the simulated flow field of the disc of the rotor 2 and leaving each vortex ring 30 free to move in the simulated flow field, influenced only by the asymptotic speed Vasint and the other vortex rings 30 released at earlier times.

In particular, the term asymptotic speed Vasint is intended as the apparent speed of the air with respect to the helicopter 3 at a sufficiently large distance from the wake of the rotor 2 such that the air can be considered as undisturbed by the wake.

Preferably, the processing unit 14 is configured to compute the velocity of the control points A, B, C and D of each vortex segment 30 on the basis of the effect of all the other vortex rings 30 present in the simulated flow field and/or the wind and/or the asymptotic speed Vasint.

In greater detail, the processing unit 14 is configured to keep the value of the circulation $\Gamma$ constant during the movement step of the vortex ring 30.

Figure 6:
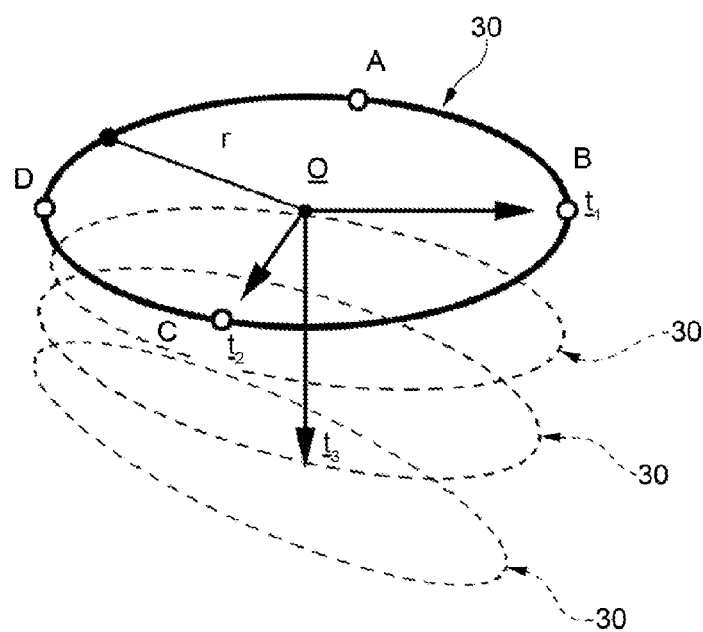
FIG. 6 shows the step of updating the vortex ring of FIGS. 3 to 5.

The processing unit 14 is further configured to make each vortex ring 30 keep its circular shape during its movement (FIG. 6).

The work cycle that the processing unit 14 is configured to execute is described below, starting from the release of a vortex ring 30 in the simulated flow field to be simulated.

More specifically, the simulated flow field comprises other vortex rings 30 generated prior to the vortex ring 30 under consideration and not yet eliminated, and other vortex rings 30 generated after the vortex ring 30 under consideration.

Figure 4:
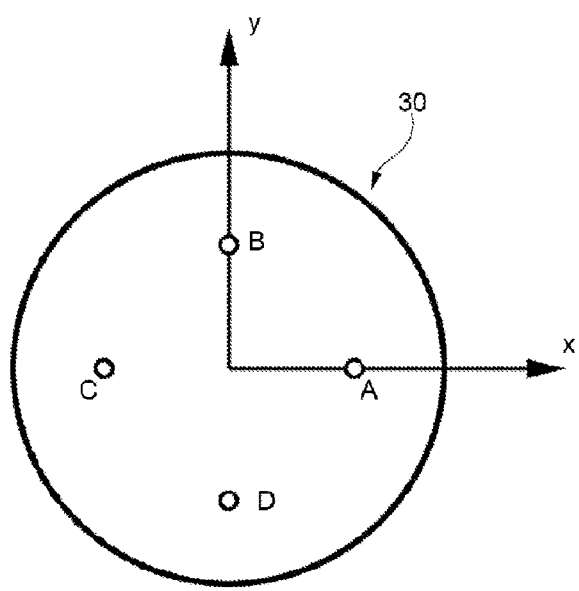
FIG. 4 shows the vortex ring of FIG. 3 and the associated control points.

In detail, the processing unit 14 is configured to associate the control points A, B, C and D (FIGS. 4 to 6) to each vortex ring 30 at the instant of release.

In addition, at the instant of generation, the control points A, B, C and D are arranged along the mutually perpendicular x and y axes (FIG. 4) of a reference system integral with the disc of the rotor 2 and centred on an axis of the rotor 2. The reference system also comprises a z-axis orthogonal to the disc of the rotor 2 and to the x and y axes.

The position of the points A, B, C and D along the x and y axes is parameterized via a multiplication coefficient $\epsilon_r$ of the radius of the rotor 2, variable between 0.2 and 0.9 and, in the case illustrated, preferably less than 0.8.

The position of the four control points in the reference system x, y, z integral with the disc of the rotor 2 is the following:
$A=(R\epsilon_r; 0; H_{hub})$; $B=(0; R\epsilon_r; H_{hub})$;
$C=(-R\epsilon_r; 0; H_{hub})$; $D=(0; -R\epsilon_r; H_{hub})$.
and, for greater clarity, is graphically illustrated in FIG. 4. In particular, $H_{HUB}$ corresponds to the position of the hub of the rotor 2 along the z-axis.

Figure 5:
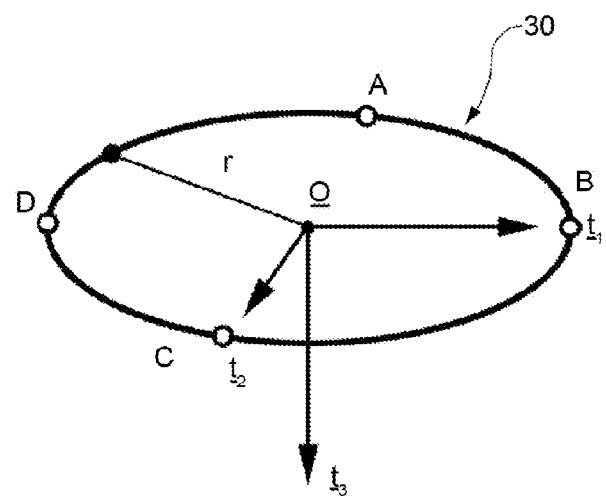
FIG. 5 shows the reference system of the vortex ring of FIGS. 3 and 4.

The vortex ring 30 is unambiguously determined by three pieces of information: by the position of the centre O, its radius r and, lastly, by three versors, t3 normal to the plane of the ring and directed downwards, t1 directed towards control point B and t2 consequently directed towards control point C, so as to have a ???right-handed triad??? (FIG. 5).

At the instant of generation, the radius r takes the value R of the radius of the rotor 2, the centre will be positioned at the centre of the hub of the rotor 2 and the versors t1, t2, t3 coincide with the axes x, y, z.

At this point, the processing unit 14 is configured to:
compute the self-induced velocities of the just-released vortex ring 30 on its control points A, B, C and D, according to the relations (1) indicated further on; and
compute, the velocities induced on the control points A, B, C and D of the other vortex rings 30 present in the simulated flow field as well, using an entirely similar procedure.

Once the velocities induced in each of the control points A, B, C and D of the vortex ring 30 are known, the processing unit 14 moves the vortex ring 30 in the flow field.

To that end, the processing unit 14 is configured to calculate, with an integration step size $\Delta t$, the position of the centre O(t), the radius r(t) and the inclination via the three versors t1(t), t2(t) and t3(t) of each vortex ring 30 (FIG. 6).

More specifically, the processing unit 14 computes the updated position vector $P(t+\Delta t)$ of points A, B, C and D of the vortex ring 30 at the next temporal instant $t+\Delta t$, on the basis of the current position P(t) of the control points A, B, C and D and a vector V(t), according to the formulae:

$$P(t+\Delta t)=P(t)+V(t)\Delta t;$$

$$V(t)=Vind(t)+Vasin(t).$$

In detail, vector V(t) is equal to the sum of vector Vind(t) containing the velocity components induced at points A, B, C and D of the vortex rings 30 and the components Vasin(t) of the asymptotic speed Vasin(t) in each of the control points A, B, C and D.

In other words, the vectors P(t+Δt), P(t) and V(t) have 12 columns, and comprise each four sets of three scalar values associated with the position coordinates and velocities of the control points A, B, C and D.

Once the new position P(t+Δt) of the control points A, B, C and D is calculated and after a time interval Δt, the processing unit 14 updates the vortex ring 30.

In particular, to update the vortex ring 30, the processing unit 14 derives the new position of the vortex ring 30 in terms of the centre O(t+Δt) and radius r(t+Δt) and versors t1(t+Δt), t2(t+Δt) and t3(t+Δt) of the new reference system integral with the vortex ring 30.

In particular, the quantities calculated at time t+Δt refer to the updated vortex ring 30, while the quantities calculated at time t refer to the same displaced vortex ring 30, but which is still to be updated.

In particular, the processing unit 14 is configured to calculate the position of the updated centre O(t+Δt) of the updated vortex ring 30 as the barycentre of the positions of the control points A, B, C and D at time t.

The processing unit 14 also calculates the radius r(t+Δt) at time t+Δt as:

$$r(t+\Delta t) = \frac{1}{4 \cdot \varepsilon_r}((OA(t+\Delta t), +OB((t+\Delta t) + OC((t+\Delta t) + OD((t+\Delta t)))$$

where:

OA(t+Δt), OB(t+Δt), OC(t+Δt) and OD(t+Δt) are the distances between the updated centre O(t+Δt) and the control points A, B, C and D st time t+Δt; and $\varepsilon_r$ is the parameter specified in the foregoing.

The processing unit 14 has thus completed the step of updating the vortex ring 30.

At this point, the processing unit 14 repositions the updated control points A, B, C and D on the updated vortex ring 30 at a distance $r(t+\Delta t)\varepsilon_r$ from the updated centre O(t+Δt).

The processing unit 14 is configured to eliminate the vortex ring 30 after a given time interval expires.

Lastly, the processing unit 14 is configured to compute the velocities at points of the flow field of interest, such as points of the surfaces 5, as a combined effect of the velocities induced at points A, B, C and D of the vortex rings 30 present in the flow field through relations (1) and the asymptotic speed Vasin of the air with respect to the helicopter 3.

Once the velocities induced on the points of the surface 5 are known, the processing unit 14 is configured to calculate the consequent aerodynamic loads on the surface 5, using the aerodynamic data of the helicopter 3 stored in the storage unit 17.

Finally, the processing unit 14 calculates the accelerations at the points of the surface 5 due to the aerodynamic loads present on the same points of the surface 5.

These accelerations are used as control signals for the actuators 15 and for the display devices 16.

In the case where the pilot requests, via the control devices 11, to simulate a flight manoeuvre in ground effect, the processing unit 14 is configured to:

generate a symmetrical fictitious vortex ring 30 with respect to each said vortex ring 30 and mirrored with respect to the ground; and compute the velocity induced on said control points A, B, C and D of each said vortex ring 30 also on the basis of the effect of the fictitious vortex rings.

Figure 8:
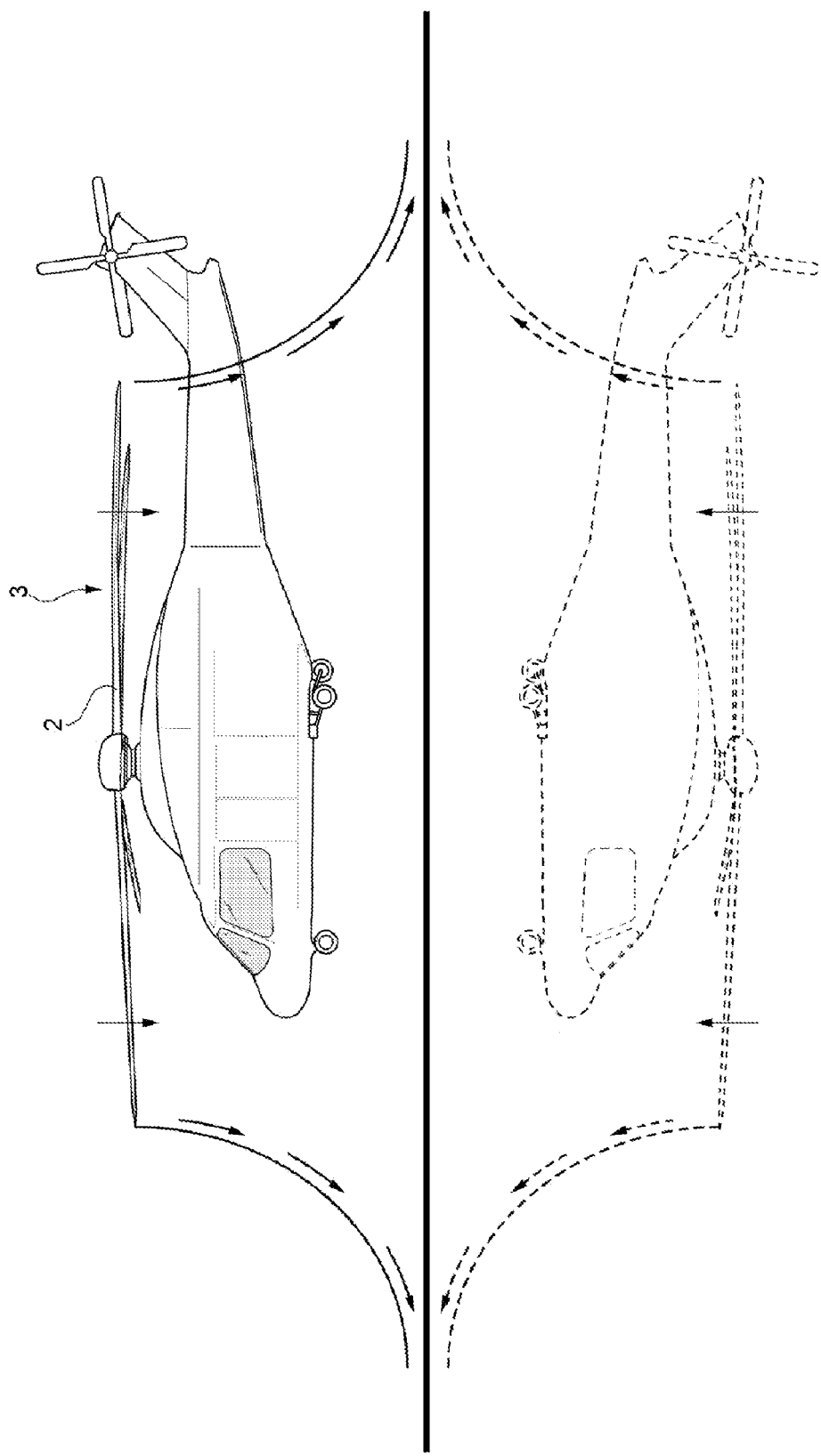
FIG. 8 schematically shows the simulation scheme utilized by the system according to the invention to simulate a flight condition in ground effect.

In this way, the system 1 simulates the presence of a fictitious rotor of equal, but opposed, force to the rotor 2 and located in a position symmetrical to the rotor 2 itself and mirrored with respect to the ground (FIG. 8).

Thanks to this, the system 1 is able to efficaciously simulate the fact that, in conditions of flight manoeuvring in ground effect, the flow tube generated by the rotor 2 does not extend infinitely, but strikes the ground.

Figure 3:
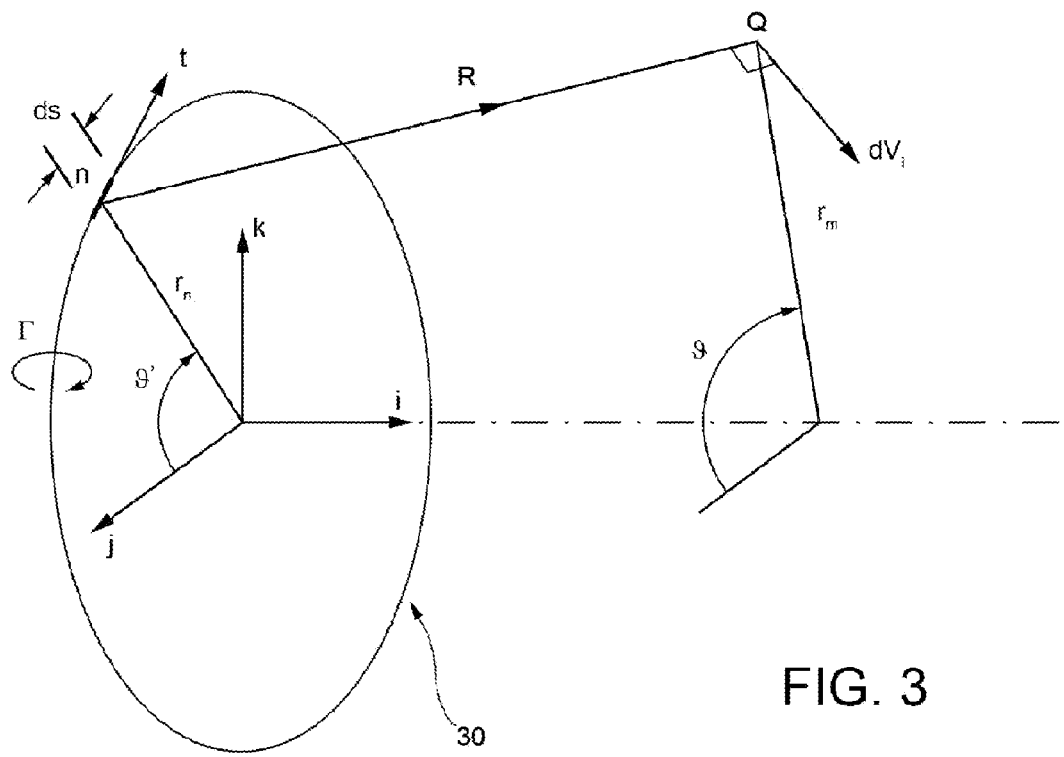
FIG. 3 is a geometrical representation of a vortex ring.

In the following, it is described how the processing unit 14 computes the velocity field induced by each vortex ring 30 on the control points A, B, C and D of each vortex ring 30 (see FIG. 3).

More precisely, the processing unit 14 is configured to derive, in closed form, the infinitesimal value of induced velocity $d\underline{V}_i$ induced by the i'th segment ds of the vortex ring with coordinates $r_n$, σ' at a generic point Q with coordinates $r_m$, σ on the basis of the Biot-Savart Law:

$$dV_i = \frac{\Gamma}{4\pi} \frac{ds t \times Z}{|Z|^3}$$

In the previous relation, the versor of the analysed vortex segment of length ds is indicated as t and the position vector of the generic point Q with respect to the vortex ring 30 as Z. These quantities are defined as indicated below:

$$\begin{cases} \underline{t} = -\sin\vartheta' \underline{j} + \cos\vartheta' \underline{k} \\ ds = r_n d\vartheta' \\ Z = (x_m - x_n)\underline{i} + (r_m\cos\vartheta - r_n\sin\vartheta')\underline{j} + (r_m\sin\vartheta - r_n\sin\vartheta')\underline{k} \end{cases}$$

The processing unit 14 is further configured to use the above-stated relations and calculate the axial velocity component $u_{mn}$ and the radial velocity component $v_{mn}$ by performing the following integrals (1) between θ'=0 and θ'=2π:

$$v_{mn} = \frac{\Gamma}{4\pi} \int_0^{2\pi} \frac{(x_n - x_m)\cos(\vartheta')}{[(x_m - x_n)^2 + r_m^2 + r_n^2 - 2r_m r_n \cos(\vartheta - \vartheta')]^{3/2}} d\vartheta'$$

where $x_n$ and $x_m$ are the coordinates of the i'th segment of the vortex ring 30 (indicated as point n in FIG. 3) and point Q. The other quantities are those visible in FIG. 2.

These relations are integrable by using elliptic integrals of the first and second kind according to the following integration formulae (1):

$$v_{mn} = \frac{-\Gamma v/w}{2\pi r_n \sqrt{v^2 + (w+1)^2}} \left( K(k) - \left(1 + \frac{2v}{v^2 + (w-1)^2}\right) E(k) \right)$$

$$u_{mn} = \frac{\Gamma}{2\pi r_n \sqrt{v^2 + (w+1)^2}} \left( K(k) - \left(1 + \frac{2(w-1)}{v^2 + (w-1)^2}\right) E(k) \right)$$

where:
K(k) and E(k) are the complete elliptic integrals of the first and second kind, the calculation of which will be illustrated below;
Γ is the value of the circulation of the velocity vector along the vortex ring 30;
v and w are the non-dimensional axial and radial coordinates:

$$v = \frac{r_m}{r_n}; w = \frac{x_m}{x_n}$$

$$k = \sqrt{\frac{4w}{v^2 + (w+1)^2}} = \sin\phi$$

The processing unit 14 is, in particular, configured to calculate the value of the circulation Γ, at the instant of release, according to the formula:

$$\Gamma = k_\Gamma 4 k_p \frac{T}{\rho V_{tip} S \sigma}$$

where:
T is the instantaneous value of the rotor 2 thrust set by the pilot via the control devices 11;
$V_{tip}$ is the tip speed of the rotor 2 set by the pilot via the control devices 11;
S is the area of the rotor 2 stored in the storage unit 17;
ρ is the air density stored in the storage unit 17;
σ is the rotor solidity, namely a parameter representative of the portion of the surface of the rotor 2 occupied by the blade, stored in the storage unit 17;
$k_\Gamma$ is a corrective coefficient, equal to 1.2 in the case illustrated and stored in the storage unit 17; and
$k_\Gamma$ is a coefficient introduced in order to take into account that the vortex rings 30 are not released at every blade passage, but with a periodicity such as to ensure a sufficiently dense distribution of vortex rings 30 within the wake.
In the case illustrated, $$k_p = \frac{R}{|u| + |V a \sin|}$$

where:
$u = \sqrt{R/2\rho A}$;
R is the radius of the rotor 2; and
Vasin is the asymptotic speed.
The integration formulae (1) are singular. In particular, the axial and radial components $u_{mn}$ and $v_{mn}$ of the induced velocity at point P are singular when v=0 and w=1, i.e. on the edges of the vortex ring 30; the radial component $v_{mn}$ of the induced velocity at point P is also singular for w=0, i.e. at the points that lie on the axis of the vortex ring 30.
To resolve these singularity problems, the processing unit 14 is configured to impose a desingularization core in proximity to w=1 where the axial and radial components $u_{mn}$ and $v_{mn}$ of the induced velocity at point P are considered to vary linearly between the velocity value at w−ϵ and w+ϵ.
Preferably, ϵ=0.05 w. The value of 0.05 has been chosen to avoid overly steep velocity gradients on the edge of the ring, in accordance with the physical phenomenon.

With regard to the singularity of the radial component $v_{mn}$ in v=0, the processing unit 14 is also configured to impose a desingularization core with radius ϵ=0.05r.
It is important to note that the radial component $v_{mn}$ is also singular, but tends to zero as w→0. In this case, the processing unit 14 is configured to use a small, discretionary desingularization core, and it has been chosen to use $10^{-8}$.
The processing unit 14 is also configured to compute parameters K(k) and E(k) according to the formulae:

$$K(k) = \int_0^{\pi/2} \frac{1}{\sqrt{1 - k^2 \sin^2\alpha}} d\alpha$$

$$E(k) = \int_0^{\pi/2} \sqrt{1 - k^2 \sin^2\alpha}\, d\alpha$$

To that end, the storage unit 17 has universally valid tables stored in memory to compute the values K(k) and E(k) as parameter k changes.
The limit of validity for these tables is as ϕ(k)→90° where the integrals are singular. The processing unit 14 is configured to apply the following asymptotic expressions in proximity to ϕ(k)=90°:

$$K(k) = \ln(4/\cos(\phi))$$

$$E(k) = 1 + \frac{1}{2}\left(K(k) - \frac{1}{1.2}\right)\cos^2(\phi)$$

The processing unit 14 is preferably configured to linearly interpolate these tables to obtain the necessary ϕ(k) value.
In particular, the tables stored in the processing unit are created in an ordered manner, from Φ(i)=0°→Φ(i)=89.5° in steps of 0.5°. In this way, the position in the table of the value closest to, but of lower modulus than that analysed is unambiguously locatable as:

$$i = \text{floor}(\phi(k)/\Phi(N)\cdot(N-1)+1)$$

where N=180 is the maximum index of the tables, ϕ(k) is the value being analysed and Φ(i) is the table value. The higher modulus value, the second point through which to make the interpolation line pass is simply the value in the next position (i+1); and where the function floor ( . . . ) returns the integer immediately below the value passed to it.
The processing unit 14 is further configured such that the value Δτ is greater than value Δt and, in the case illustrated, is equal to $k_p/4$.
In particular, the processing unit 14 is configured to execute the above-stated cycle in a reference system integral with the vortex ring 30 and, in consequence, has a series of rotation matrices stored in memory and suitable for permitting the transformation of an inertial reference system integral with the ground to the reference system $t_1, t_2, t_3$ integral with each vortex ring 30.
Furthermore, a software program is loaded in the memory of the processing unit 14 that, when executed, is capable of implementing the above-stated cycle.
In use, the pilot carries out simulated flight manoeuvres by giving simulated commands via the control devices 11. These simulated commands simulate certain flight conditions, for example the thrust T values of the rotor 2, and flight manoeuvres, for example, a flight manoeuvre in ground effect or a hovering manoeuvre.

Based on the data stored in the storage unit 17 and the simulated commands imparted to the control devices 11, the processing unit 14 executes the previously described cycle, and for the execution of which it is configured.

In other words, the processing unit 14 simulates, according to the previously described cycle, the aerodynamic loads due to the interaction of the wake of the rotor 2 with the helicopter 3 and, in particular, with the surfaces 5 of the helicopter 3.

The processing unit 14 also calculates the accelerations generated by the above-mentioned aerodynamic loads on the surface 5.

At the end of this cycle, the processing unit 14 generates the control signals for the actuators 15 and for the display device 16 corresponding to the simulated aerodynamic loads and, in consequence, to the flight commands simulated by the pilot.

From examination of the system 1 and the method embodied according to the present invention, the advantages that can be achieved with it are evident.

In particular, the system 1 enables simulating aerodynamic loads generated by interaction of the wake of the rotor 2 with the helicopter 3 with greater accuracy than the system described in the introductory part of the present description and without requiring test flights to be carried out.

In particular, the applicant has observed that the aerodynamic loads associated with the interaction of the wake of the rotor 2 with the helicopter 3 are simulated in a sufficiently true-to-life manner by generating a number of vortex rings 30 in the range between 20 and 30.

Figure 7:
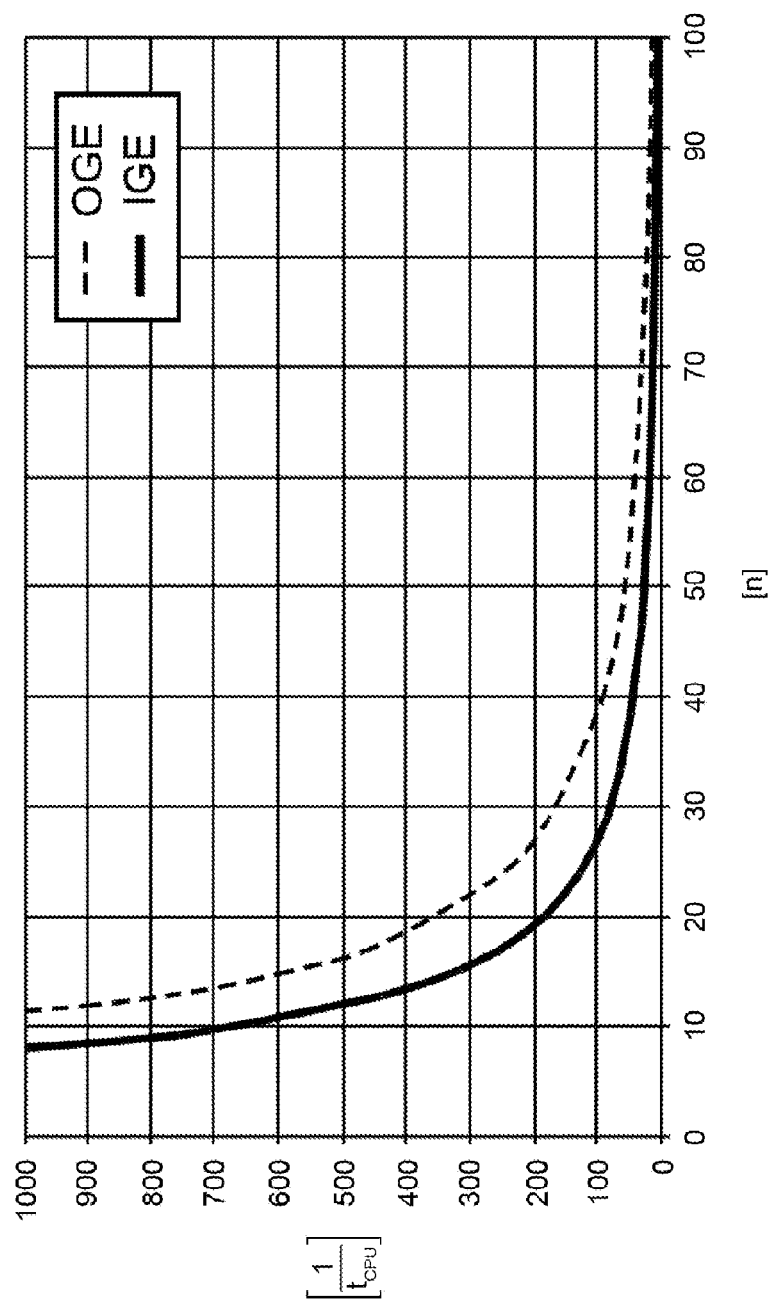
FIG. 7 shows, for various simulated flight conditions, the curve of the inverse of the time utilized by the system according to the invention to simulate the interaction of the rotor wake with the aircraft against variations in the number of vortex rings in the simulation, with regard to conditions of in ground effect (IGE) hovering and out of ground effect (OGE) hovering.

As shown in FIG. 7, the generation of a number of vortex rings in the range between 20 and 30 requires calculation times $t_{cpu}$ for the processing unit that are compatible with the real-time generation of control signals for the actuators 15, with regard to both hovering in ground effect (IGE) conditions and hovering out of ground effect (OGE) conditions.

In addition, the system 1 enables simulating numerous flight conditions with precision and in real time, for example, hovering, forward flight, lateral flight, flight in ground effect, autorotation, climb and descent manoeuvres.

Lastly, the system 1 enables simulating the velocities resulting from the wake of the rotor 2 at desired points of the flow field, even at some distance from the helicopter 3, such as points on the ground for example.

Finally, it is clear that modifications and variations can be applied to the system 1 and to the method described herein without leaving the scope of protection of the claims.

In particular, the processing unit 14 could be configured to ignore the effect on each vortex ring 30 of the other vortex rings 30 present in the simulated flow field at a distance greater than a threshold value, for example, equal to twice the radius of the vortex rings 30.

The invention claimed is:

1. A real-time simulation system of the effect of aerodynamic loads generated by the wake of a rotor of a hover-capable aircraft on the aircraft itself, comprising:
    a cockpit seat for a pilot;
    at least one simulated control device of said aircraft, which is able to receive a simulated command from said pilot to simulate a flight condition of said aircraft;
    a plurality of simulation devices able to generate a simulated representation of said flight condition and perceptible from the cockpit seat;
    a processing unit configured to receive a first signal associated with said command given via said control device in input and to generate and output a second control signal for said plurality of simulation devices associated with said simulated aerodynamic loads;
    characterized in that said processing unit is further configured to execute a cycle comprising the steps of:
        a) generating, with a given period and in a simulated flow field, a vortex ring with a radius associated with the value of the disc circumference of said rotor and with a velocity circulation proportional to the thrust of said rotor set by said pilot via said control device;
        b) associating one or more control points to said vortex ring;
        c) computing one or more velocities induced on said control points by the vortex ring present in said simulated flow field and an asymptotic speed (Vasin) of the air with respect to said aircraft;
        d) moving said vortex ring according to said velocities induced on said control points;
        e) updating said vortex ring after said movement step;
        f) computing the velocity induced on at least one point of interest of said aircraft on the basis of the velocities induced on said control points of said vortex ring present in the simulated flow field and said asymptotic speed (Vasin); and
        g) generating said second control signal on the basis of said velocities induced on said point of interest of said aircraft.

2. The system according to claim 1, characterized in that said cycle further comprises the further step of:
    h) eliminating said vortex ring from said simulated flow field after a given time interval has expired.

3. The system according to claim 1, characterized in that said processing unit is configured to maintain said velocity circulation constant during said movement step d).

4. The system according to claim 1, characterized in that said processing unit is configured to maintain said vortex ring in a circular shape during said movement step d).

5. The system according to claim 4, characterized in that said step d) of moving said vortex ring of said cycle comprises the steps of:
    i) computing a current position vector P(t) of said control points of said vortex ring;
    j) computing an induced-speed vector (V(t)) equal to the sum of a vector representative of said asymptotic speed (Vasin(t)) and a current speed vector (Vind(t)) of said control points; and
    k) computing an updated position vector (P(t+Δt)) of said current control points as (P(t+Δt))=P(t)+V(t+Δt) Δt, wherein Δt is an update time interval.

6. The system according to claim 5, characterized in that said step e) of updating said cycle comprises the step of:
    l) calculating an updated center (O(t+Δt)) of said vortex ring, updated on the basis of said updated position vector (P(t+Δt)) of said control points;
    m) calculating an updated radius (r(t+Δt)) of said vortex ring, updated on the basis of said updated center (O(t+Δt)) and said updated position vector (P(t+Δt)); and
    n) repositioning said control points of said vortex ring on the basis of said updated center (O(t+Δt)) and said updated radius (r(t+Δt)).

7. The system according to claim 6, characterized in that said processing unit is further configured to:
    o) calculate said updated center (O(t+Δt)) of said vortex ring as the barycenter of said control points ((t+Δt)); and p) reposition said control points ((t+Δt)) at a distance from said updated center (O(t+Δt)) less than the average of said distances of said control points from said updated center (O(t+Δt)).

8. The system according to claim 5, characterized in that said period is greater than said update time interval Δt.

9. The system according to claim 1, characterized in that said step a) comprises the step of generating said vortex ring with said radius equal to a radius of said rotor.

10. The system according to claim 1, characterized in that said processing unit is configured to:
  q) acquire from said control device a signal representative of a simulated flight condition wherein said aircraft is in ground effect;
  r) generate a symmetrical fictitious vortex ring with respect to said vortex ring and mirrored with respect to the ground; and
  s) compute the velocities induced on said control points of said vortex ring also on the basis of the effect of the fictitious vortex rings.

11. The system according to claim 1, characterized in that said generation step a) comprises the step of generating said vortex ring with said radius equal to a radius of said rotor.

12. The system according to claim 1, characterized in that said plurality of simulation devices comprise:
  a plurality of actuators able to generate simulated aerodynamic loads on said cockpit seat; and
  a display device able to generate simulated visual indications that are visible from said cockpit seat.

13. A method supported by a processing unit to simulate in real time the effect of aerodynamic loads generated by the wake of a rotor of a hover-capable aircraft on the aircraft itself, comprising the steps of:
  a) simulating a flight condition of said aircraft;
  b) generating, by said processing unit, a simulated flight representation of said flight condition that is perceptible from a cockpit seat for a pilot;
  c) configuring said processing unit to execute a cycle comprising the steps of:
  d) generating in a simulated flow field, with a period, a vortex ring with a radius associated with a radius of the disc of the said rotor and with a velocity circulation proportional to the thrust of said rotor set by the said pilot via said control device;
  e) associating one or more control points with said vortex ring;
  f) computing one or more velocities induced on said control points by the vortex ring present in said simulated flow field and an asymptotic speed of the air with respect to said aircraft;
  g) moving said vortex ring according to said velocities induced on said control points;
  h) updating said vortex ring after said movement step;
  i) computing the velocity on at least one point of interest of said aircraft on the basis of said velocities induced on said control points of said vortex ring present in said simulated flow field and said asymptotic speed; and
  j) generating, on the basis of said velocities induced on said point of interest of said aircraft, said simulated flight representation.

14. The method according to claim 13, characterized in that said cycle further comprises the step k) of eliminating said vortex ring from said simulated flow field after a given time interval has expired.

15. The method according to claim 13, characterized in that said movement step g) comprises the step l) of maintaining said velocity circulation constant.

16. The method according to claim 13, characterized in that the movement step g) comprises the step m) of maintaining said vortex ring in a circular shape during said movement step.

17. The method according to claim 16, characterized in that said step g) of moving said vortex ring of said cycle comprises the steps of:
  n) computing a current position vector P(t) of said control points of said vortex ring;
  o) computing a current speed vector (V(t)) equal to the sum of an asymptotic speed vector (Vasin(t)) and a current induced-speed vector (Vind(t)) on said control points from one or more other vortex rings of said flow field;
  p) computing an updated position vector (P(t+Δt)) of said control points as (P(t+Δt))=P(t)+V(t)Δt, wherein Δt is an update time interval.

18. The method according to claim 17, characterized in that said updating step h) comprises the steps of:
  q) calculating an updated center (O(t+Δt)) of said vortex ring on the basis of said updated position vector (P(t+Δt)) of said control points;
  r) calculating an updated radius (r(t+Δt)) of said vortex ring on the basis of said an updated center (O(t+Δt)) and said updated position vector (P(t+Δt)); and
  s) repositioning said control points of said vortex ring on the basis of said an updated center (O(t+Δt)) and said updated radius (r(t+Δt)).

19. The method according to claim 18, characterized in that said updating step h) comprises the steps of:
  t) calculating said updated center (O(t+Δt)) of said vortex ring as the barycenter of said control points; and
  u) repositioning said control points at a distance from said updated center less than the average of the distances of said control points from said updated center (O(t+Δt)).

20. The method according to claim 13, characterized in that it comprises the steps of:
  v) acquiring from said control device a signal representative of a flight condition in ground effect;
  w) generating a symmetrical fictitious vortex ring with respect to said vortex ring and mirrored with respect to the ground; and
  z) computing the velocities induced on said control points of said vortex ring also on the basis of the fictitious vortex rings.

21. The method according to claim 13, characterized in that said generation step a) comprises the step of generating said vortex ring with said radius equal to a radius of said rotor.

22. The method according to claim 13, characterized in that said step j) comprises the step of generating simulated aerodynamic loads on a cockpit seat occupied by said pilot, and displaying simulated visual indications that are visible from said cockpit seat.

* * * * *